E. L. JONES & M. E. CARTER.
DOVETAILING MACHINE.
No. 33,087. Patented Aug. 20, 1861.
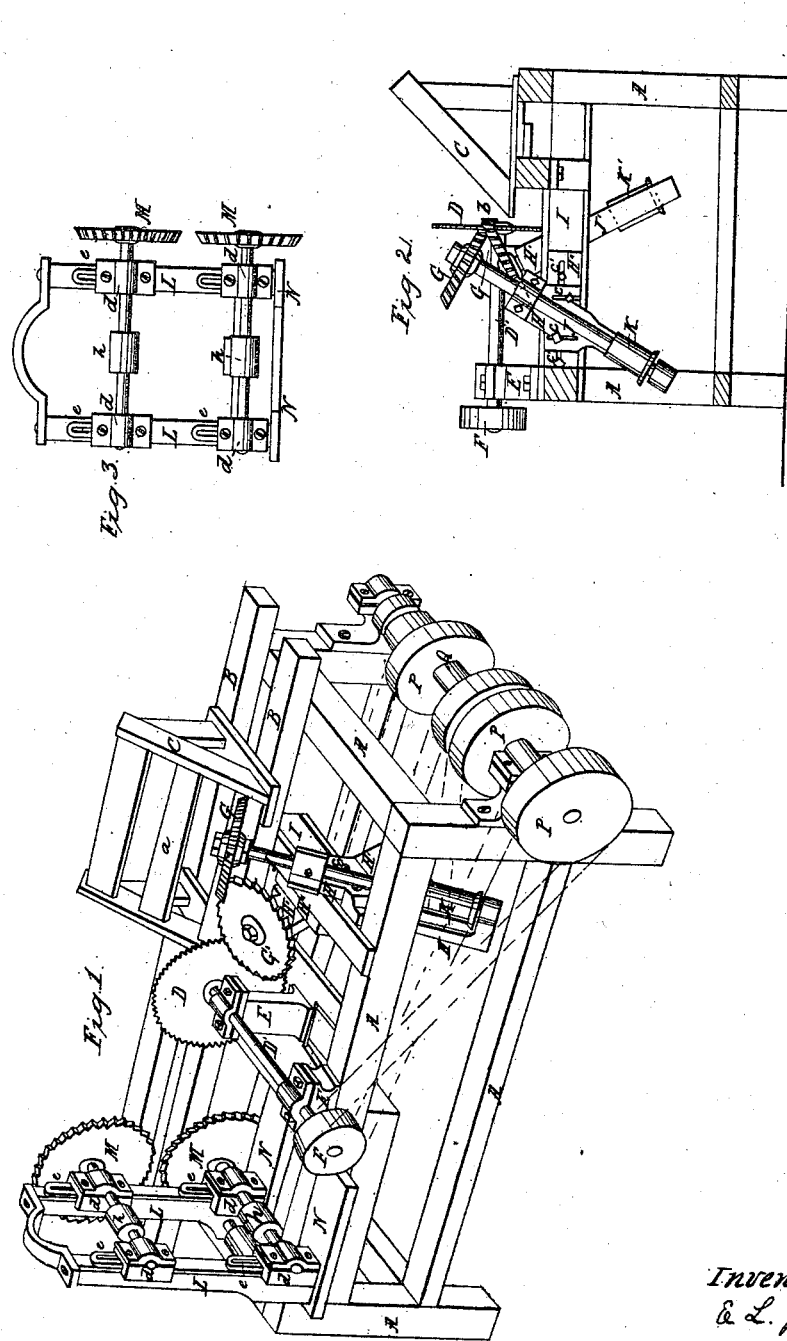

UNITED STATES PATENT OFFICE.

E. L. JONES AND M. E. CARTER, OF ST. LOUIS, MISSOURI.

DOVETAILING-MACHINE.

Specification of Letters Patent No. 33,087, dated August 20, 1861.

*To all whom it may concern:*

Be it known that we, E. L. JONES and M. E. CARTER, of St. Louis, in the county of St. Louis and State of Missouri, have invented an Improved Machine for Forming Dovetail Joints; and we do hereby declare that the following is a full and exact description thereof, reference being had to the accompanying drawings, making part of this specification.

Figure 1, is a view, in perspective, of the machine; entire; Fig. 2, a transverse, vertical section of the same, the part for forming the tenons, or tongues, of the joints, being removed; Fig. 3, a front elevation of said tenon-forming part detached.

Like letters designate corresponding parts in all the figures.

The frame A, is made of such parts, form and dimensions as may be suitable, or required for convenience, substantially as shown in the drawings. Upon one side thereof are secured ways B, B, on which a miter carriage C, is to move forward and backward. This carriage is made in any convenient manner, so as to slide accurately on the ways B, B, and to sustain the pieces to be joined together, at the proper angle—generally at 45 degrees from the vertical and horizontal planes, as represented. The pieces to be subjected to the operation are to rest on the inclined bars *a*, between the head pieces of the carriage.

The operations to which the pieces, or boards, are to be subjected, in forming the dovetail joints, are, first, in all cases, to miter the edges thereof; and, second, to form the dovetail mortises, or the dovetail tenons, as the case may be. We employ a single mitering saw D, to prepare, both for cutting the mortises and the tenons; and arrange the devices, both for mortising and for tenon cutting, in the proper relation to said mitering saw D, and the miter carriage C, but independently of each other, so that either device may be moved out of the way of the operation of the other, when that other is to be used; as will be hereinafter set forth.

The mitering saw D, revolves in a vertical plane, being mounted on its arbor D′, in suitable bearings E, E, and driven by a band which transfers the power to a pulley F, on said arbor, from a driving wheel P, in any convenient manner. This saw is in a fixed position, but may be adjustable, if desired.

For mortising, we employ two saws, or cutters, G, G′, both revolving in planes oblique (equally or not,) to that in which the mitering saw D, cuts, the degree of obliquity being as great as desired. The planes in which these saws run cross each other in a plane coinciding with the facing side of the mitering saw, so that the narrowest part of the mortises may be in the miter edges of the pieces, or boards, as shown in Fig. 2. The thickness of these saws, in their vertical planes, should be equal to the narrowest part of the dovetail mortises, as represented. Their edges should project beyond the mitering plane, (as at *b*, Fig. 2,) a distance equal to the required depth of the mortises; and the saws should be conical, or beveled, so that their edges shall be vertical at said point *b*, (as indicated in the same figure,) thus making the bottoms of the mortises parallel with the mitered edges of the pieces.

The saws, or cutters, G, G′, are situated adjacent to each other, as closely as practicable, in order to occupy as little room as they may; and their arbors J, J′, run in bearings H, H′, which have flanges whereby they are attached to supports H″, H″. The bearing flanges are provided with slots *c, c,* (Fig. 2,) or their equivalents, by which they are adjusted vertically on their supports H″, H″, and tightened by screws, as represented. This vertical adjustment serves to vary the lateral position and the width of the dovetail mortises to be made by the saws G, G′. It may also be adapted or extended to the purpose of varying the inclination of the said saws, if desired.

The supports H″, H″, are situated in the side grooves or ways of a transverse bar I, in which they slide when the saws G, G′, are to be brought to their working position, or moved aside for tenon-cutting to be performed on the machine. Slots *c′, c′,* (Fig. 2,) and tightening screws therein, or an equivalent arrangement, will serve to allow the transverse movements of these saw supports, and to hold them securely in any position. Any suitable guide, gage, or stop is used to indicate, or gage, the right position of the saws for operation. By this arrangement, also, the saws may be adjusted horizontally, so as to make deeper, or shallower, mortises or grooves. Any other equivalent means for giving the transverse movements to the saws may be employed. A single support, or frame, may be used to carry both saws G, G′, together.

In forming dovetail mortises, as above, it is necessary that the saws G, G', should be in oblique planes. This unavoidably complicates the construction, more or less. But, for cutting dovetail tenons, no such necessity of placing the saws, or cutters, M, M', in inclined planes exists. We, therefore, place them in vertical planes, or parallel with the movement of the mitering saw D, as indicated most clearly in Fig. 3. Here it is seen that the two saws are placed, one directly over the other, in vertical planes, at the proper distance apart to form the required thickness of tenon; and their cutting edges are beveled, so as to give the required dovetail form, as represented. Their thickness is to be sufficient to cut the required height of the tenons. They are placed on arbors, which turn in bearings $d$, $d$, on a single frame, or carriage, L, N. These bearings are provided with slotted flanges $e$, $e$, by which they are secured to, and adjusted vertically on, the frame, with tightening screws. This vertical adjustment provides for varying the lateral position and the thickness of the tenons to be formed by the saws, or cutters, M, M'. The frame, or carriage, L, N, is situated on the principal frame A, of the machine, (as shown in Fig. 1,) and has a transverse movement on said frame, so that it may be readily brought to the work, at any time, for forming tenons, or moved aside, when mortising is to be done on the machine. The horizontal position of the tenon saws is also adjusted by the same means. A suitable guide, or gage, is employed, to indicate, or gage, the right position of the saws for cutting the tenons.

The mortising saws G, G', are driven by bands, communicating motion to pulleys K, K', on their arbors, from driving wheels P, P. Similar bands, also, communicate motion to pulleys $h$, $h$, on the arbors of the tenon-cutting saws M, M'.

The mitering saw D, is situated near the middle of the machine; and the mortising device is situated at one side while the tenon-cutting device is at the other side thereof, as shown in Fig. 1. The whole is made as compact as possible. Thus, it is seen that the entire arrangement of the machine has direct reference to performing the different operations with the least and most simple and direct movements, with the minimum requisite of power, and in the most expeditious manner. Simplicity and cheapness of construction are, also, aimed at; since, although fewer parts might be employed, such a construction would be at the expense of greater difficulty and intricacy of construction and adjustment. For example, the same saws might be used for cutting both the mortises and tenons; but this would render several nice adjustments necessary, at every time when a change were to be made from mortising to tenon-cutting, and vice versa; whereas, with our machine, the change may be made from one to the other, by merely moving the tenon-cutting, or the mortising, device to one side, and bringing the other up to the work, without any adjustment at all. Again, the mortising and tenon-cutting devices might be placed so far from the mitering saw D, as not to require to be moved out of place, at all; but this would render necessary a greatly increased length of the machine, and additional motion, time, and power.

The mode of operating the machine may be readily understood, from the above description of its parts, and of their operation. It may be merely added, here, that the pieces are first placed upon the miter carriage C, and then moved thereon past the mitering saw D; thence continuing the movement past the mortising saws G, G', or the tenon-cutting saws M, M', according to which operation, mortising, or tenon-cutting, is to be done, either set of saws G, G', or M, M', being moved aside, when the other set is to be used.

We disclaim all arrangements and devices substantially different from our own in the respect to which the substance of our claim relates, and as above defined.

We disclaim the mitering, mortising, and tenon-cutting devices herein described, when employed separately; but

What we claim as our invention and desire to secure by Letters Patent is—

The combined arrangement of the mitering, mortising, and tenon-cutting devices in the machine, substantially in the manner and for the purpose herein specified.

E. L. JONES.
M. E. CARTER.

Witnesses:
T. S. KILBY,
N. L. GRIFFIN.